(12) United States Patent
Xie et al.

(10) Patent No.: US 10,205,765 B2
(45) Date of Patent: Feb. 12, 2019

(54) METHOD, MULTIMEDIA STREAMING SERVICE NODE, COMPUTER PROGRAM AND COMPUTER PROGRAM PRODUCT FOR COMBINING CONTENT

(71) Applicant: TELEFONAKTIEBOLAGET LM ERICSSON (PUBL), Stockholm (SE)

(72) Inventors: Jinyang Xie, Shanghai (CN); Shaheer Jamal-Syed, Shanghai (CN); Jie Ling, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 184 days.

(21) Appl. No.: 15/031,339

(22) PCT Filed: Oct. 24, 2013

(86) PCT No.: PCT/CN2013/085908
§ 371 (c)(1),
(2) Date: Apr. 22, 2016

(87) PCT Pub. No.: WO2015/058389
PCT Pub. Date: Apr. 30, 2015

(65) Prior Publication Data
US 2016/0285941 A1  Sep. 29, 2016

(51) Int. Cl.
*H04L 29/06* (2006.01)
*H04W 4/06* (2009.01)
*H04N 21/647* (2011.01)

(52) U.S. Cl.
CPC ........ *H04L 65/602* (2013.01); *H04L 65/4076* (2013.01); *H04L 65/607* (2013.01); *H04N 21/64792* (2013.01); *H04W 4/06* (2013.01)

(58) Field of Classification Search
CPC ........ H04N 21/23614; H04N 21/64792; H04L 65/4076; H04L 65/602; H04L 65/601;
(Continued)

(56) References Cited

U.S. PATENT DOCUMENTS 8,752,085 B1 * 6/2014 Brueck ............... H04L 65/601
725/32
2007/0266122 A1 11/2007 Einarsson et al.
(Continued)

FOREIGN PATENT DOCUMENTS

CN  101755453 A  6/2010
CN  101848200 A  9/2010

OTHER PUBLICATIONS

Extended European Search Report dated Sep. 20, 2016, issued in European Patent Application No. 13895933.3, 10 pages.
(Continued)

*Primary Examiner* — Ruolei Zong
(74) *Attorney, Agent, or Firm* — Rothwell, Figg, Ernst & Manbeck, P.C.

(57) ABSTRACT

It is presented a method for combining main streaming content comprising a plurality of main segment files and secondary streaming content comprising at least one secondary segment file. The method is performed in a multimedia streaming service node and comprises the steps of: determining a time slot within the main streaming content where secondary streaming content should be provided; setting a time reference of each one of the at least one secondary segment file to correspond to a time reference of the at least one discardable main segment file; setting a sequence number of each one of the at least one secondary segment file to correspond to a sequence number of the at least one discardable main segment file; providing the main segment files which are distinct from the at least one discardable main segment file; and providing the at least one secondary segment file.

17 Claims, 6 Drawing Sheets

(58) Field of Classification Search
CPC ..... H04L 65/60; H04L 65/605; H04L 65/607; H04W 4/06
USPC ........................................................ 709/246
See application file for complete search history.

(56) References Cited

U.S. PATENT DOCUMENTS

| | | |
|---|---|---|
| 2008/0297669 A1 | 12/2008 | Zalewski et al. |
| 2008/0320073 A1* | 12/2008 | Mobasser ............ H04H 20/103 709/202 |
| 2009/0157895 A1* | 6/2009 | Van Den Berghe ........................ H04N 21/222 709/231 |
| 2009/0193457 A1 | 7/2009 | Conn |
| 2009/0217316 A1 | 8/2009 | Gupta |
| 2009/0235308 A1 | 9/2009 | Ehlers et al. |
| 2009/0257435 A1* | 10/2009 | Karlsson ............ H04N 7/17318 370/394 |
| 2009/0260030 A1* | 10/2009 | Karlsson ................ G06Q 30/02 725/32 |
| 2011/0022471 A1 | 1/2011 | Brueck et al. |
| 2015/0007218 A1* | 1/2015 | Neumann ........ H04N 21/23424 725/32 |

OTHER PUBLICATIONS

International Search Report and Written Opinion dated Jul. 30, 2014, in International Application No. PCT/CN2013/085908, 12 pages.

* cited by examiner

US 10,205,765 B2

METHOD, MULTIMEDIA STREAMING SERVICE NODE, COMPUTER PROGRAM AND COMPUTER PROGRAM PRODUCT FOR COMBINING CONTENT

CROSS REFERENCE TO RELATED APPLICATION(S)

This application is a 35 U.S.C. § 371 National Phase Entry Application from PCT/CN2013/085908, filed Oct. 24, 2013, designating the United States, the disclosure of which is incorporated herein in its entirety by reference.

TECHNICAL FIELD

The invention relates to a method, multimedia streaming service node, computer program and computer program product for combining main streaming content and secondary streaming content.

BACKGROUND

Cellular communication systems have become commonplace and are used by a large majority of people for person-to-person communication. Moreover, with the increasing use of smartphones, digitally distributed content is more and more consumed on wireless devices. While the delivery of a large part of such content, e.g. web content, needs to be directly controllable by the user, the delivery of media content, such as video, can in many cases be shared by several users.

In order to increase efficiency of shared media consumption, point-to-multipoint systems such as broadcasting and/or multicasting can be used. In this way, network resources are shared between receiving wireless devices to a higher degree. A set of related standards for point-to-multipoint content delivery using cellular communication systems is 3GPP MBMS (3rd Generation Partnership Project-Multimedia Broadcast Multicast Service) and 3GPP eMBMS (evolved MBMS).

In streaming content, as for traditional content delivery such as conventional television, it is sometimes desired to disrupt the main content to insert secondary content. The secondary content can e.g. be advertisements or other messages.

US2011022471 presents messaging services for providing updates for multimedia content delivered over the Internet for a live event. In one embodiment, a messaging server provides real-time updates for multimedia content of a live event delivered over the Internet to multiple media players that request the multimedia content over the Internet. In one embodiment, the real-time updates indicate when the multimedia content is available for delivery over the Internet. In another embodiment, the real-time updates can be used to dynamically insert advertisement markers for advertisement breaks in the multimedia content. The presented solution describes two models of including advertisements. In the first model, advertising is inserted into the video stream of the live event at some point before the video stream reaches the encoder services. Such a solution is inflexible and rigid, and does not allow advertisements to be selected freely. In the second model, each individual media player inserts one or more advertisements into the multimedia content fr live events. However, it can be troublesome for the client device to switch from a main content to secondary content and then back to the main content, since each such redirection involves rebuffering, which can e.g. result in a temporary black screen for the end user.

SUMMARY

An object is to provide a way to combine main streaming content and secondary streaming content where the disadvantages of the prior art are reduced.

According to a first aspect, it is presented a method for combining main streaming content comprising a plurality of main segment files and secondary streaming content comprising at least one secondary segment file. The method is performed in a multimedia streaming service node and comprises the steps of: determining a time slot within the main streaming content where secondary streaming content should be provided, the time slot corresponding to at least one discardable main segment file; setting a time reference of each one of the at least one secondary segment file to correspond to a time reference of the at least one discardable main segment file; setting a sequence number of each one of the at least one secondary segment file to correspond to a sequence number of the at least one discardable main segment file; providing the main segment files which are distinct from the at least one discardable main segment file, for delivery to at least one streaming client; and providing the at least one secondary segment file for delivery to the at least one streaming client. By adjusting the time reference and sequence number of the secondary streaming content, the secondary streaming content is seamlessly integrated within the main content. The streaming client(s) will in this way treat the combined streaming content, comprising main streaming content and secondary streaming content, as a single content stream. In this way, there is no need to update any general media documents, such as media presentation documents (MPDs) when applied in eMBMS or MBMS. In other words, the switching of content streams is performed on the server side, whereby the streaming client(s) are unaware of the content stream change. This prevents any switching of content streams on the client side which thereby avoids any client rebuffering associated with switching of content streams.

The main streaming content may be live content.

The multimedia streaming service node may be a broadcast/multicast service centre, in which case the steps of providing the at least one secondary segment file and providing the main segment files may comprise the use of a multimedia broadcast/multicast service, MBMS, or evolved MBMS.

The method may further comprise the step of: adjusting a time reference of each one of all main segment files after the time slot, to reflect any differences in duration between the at least one discardable main segment file and the at least one secondary segment file. In this way, the secondary streaming content does not need to be en exact match in duration with the main streaming content it replaces. Still, to the streaming client(s), the switching of content streams is transparent.

The step of determining a time slot may comprise receiving details about the time slot from a content management system.

The method may further comprise the step of: setting a filename of each one of the at least one secondary segment file where the filename includes the sequence number which is set in the respective secondary segment file.

The method may be performed for audio content as well as for video content.

In the step of setting a time reference, the time reference may include at least one of an earliest presentation time parameter and a decode time parameter of the respective secondary segment file.

The step of providing the main segment files may comprise the two substeps of: providing the main segment files which are prior to the time slot prior to the step of providing the at least one secondary segment file; and providing the main segment files which are after to the time slot after the step of providing the at least one secondary segment file.

According to a second aspect, a multimedia streaming service node for combining main streaming content comprising a plurality of main segment files and secondary streaming content comprising at least one secondary segment file. The multimedia streaming service node comprises: a processor; and a memory storing instructions that, when executed by the processor, causes the multimedia streaming service node to: determine a time slot within the main streaming content where secondary streaming content should be provided, the time slot corresponding to at least one discardable main segment file; set a time reference of each one of the at least one secondary segment file to correspond to a time reference of the at least one discardable main segment file; set a sequence number of each one of the at least one secondary segment file to correspond to a sequence number of the at least one discardable main segment file; provide the main segment files which are distinct from the at least one discardable main segment file, for delivery to at least one streaming client; and provide the at least one secondary segment file for delivery to the at least one streaming client.

The main streaming content may be live content.

The multimedia streaming service node may be a broadcast/multicast service centre, in which case the instructions to provide the at least one secondary segment file and provide the main segment files may comprise instructions that, when executed by the processor, causes the multimedia streaming service node to use of a multimedia broadcast/multicast service, MBMS, or evolved MBMS.

The multimedia streaming service node may further comprise instructions that, when executed by the processor, causes the multimedia streaming service node to: adjust a time reference of each one of all main segment files after the time slot, to reflect any differences in duration between the at least one discardable main segment file and the at least one secondary segment file.

The instructions to determine a time slot may comprise instructions that, when executed by the processor, causes the multimedia streaming service node to receive details about the time slot from a content management system.

The multimedia streaming service node may further comprise instructions that, when executed by the processor, causes the multimedia streaming service node to: set a filename of each one of the at least one secondary segment file where the filename includes the sequence number which is set in the respective secondary segment file.

The instructions may comprise instructions that, when executed by the processor, causes the multimedia streaming service node to handle audio content as well as video content.

The instructions to set a time reference may comprise instructions that, when executed by the processor, causes the multimedia streaming service node to set the time reference including at least one of an earliest presentation time parameter and a decode time parameter of the respective secondary segment file.

The instructions to provide the main segment files may comprise instructions that, when executed by the processor, causes the multimedia streaming service node to: provide the main segment files which are prior to the time slot prior to providing the at least one secondary segment file; and provide the main segment files which are after to the time slot after providing the at least one secondary segment file.

According to a third aspect, it is presented a computer program for combining main streaming content comprising a plurality of main segment files and secondary streaming content comprising at least one secondary segment file. The computer program comprises computer program code which, when run on a multimedia streaming service node causes the multimedia streaming service node to: determine a time slot within the main streaming content where secondary streaming content should be provided, the time slot corresponding to at least one discardable main segment file; set a time reference of each one of the at least one secondary segment file to correspond to a time reference of the at least one discardable main segment file; set a sequence number of each one of the at least one secondary segment file to correspond to a sequence number of the at least one discardable main segment file; provide the main segment files which are distinct from the at least one discardable main segment file, for delivery to at least one streaming client; and provide the at least one secondary segment file for delivery to the at least one streaming client.

According to a fourth aspect, it is presented a computer program product comprising a computer program according to the third aspect and a computer readable means on which the computer program is stored.

According to a fifth aspect, it is presented a multimedia streaming service node comprising: means for determining a time slot within main streaming content, the main streaming content comprising a plurality of main segment files, where secondary streaming content, comprising at least one secondary segment file, should be provided, the time slot corresponding to at least one discardable main segment file; means for setting a time reference of each one of the at least one secondary segment file to correspond to a time reference of the at least one discardable main segment file, and for setting a sequence number of each one of the at least one secondary segment file to correspond to a sequence number of the at least one discardable main segment file; means for providing the main segment files which are distinct from the at least one discardable main segment file, for delivery to at least one streaming client, and means for providing the at least one secondary segment file for delivery to the at least one streaming client.

The main streaming content may be live content.

The multimedia streaming service node may be a broadcast/multicast service centre, in which case the means for providing the at least one secondary segment file and providing the main segment files may comprise means for using a multimedia broadcast/multicast service, MBMS, or evolved MBMS.

The multimedia streaming service node may further comprise means for adjusting a time reference of each one of all main segment files after the time slot, to reflect any differences in duration between the at least one discardable main segment file and the at least one secondary segment file.

The means for determining a time slot may comprise means for receiving details about the time slot from a content management system.

The multimedia streaming service node may further comprise means for setting a filename of each one of the at least one secondary segment file where the filename includes the sequence number which is set in the respective secondary segment file.

The multimedia streaming service node may comprise means for handling audio content as well as video content.

The time reference may include at least one of an earliest presentation time parameter and a decode time parameter of the respective secondary segment file.

The means for providing the main segment files may comprise means for providing the main segment files which are prior to the time slot prior providing the at least one secondary segment file; and means for providing the main segment files which are after to the time slot after providing the at least one secondary segment file.

It is to be noted that any feature of the first, second, third, fourth and fifth aspects may, where appropriate, be applied to any other of these aspects.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

3GPP and ISO (International Organization for Standardization) have defined MPEG (Moving Picture Experts Group) DASH (Dynamic Adaptive Streaming for HTTP (HyperText Transfer Protocol)) for Internet streaming. 3GPP/MPEG DASH defines a way of how on-demand or live video content can be received using HTTP. More specifically, the video stream is segmented on the server into a media segments (i.e. segment files), which can then be fetched by clients using HTTP. The sequence of media segment URIs (Uniform Resource Identifiers) is described in a MPD (Media Presentation Document). The MPD may describe the sequence of media segment URIs as playlist or in template format. In case of live streaming, the client is responsible to determine whether or not a media segment URI is already valid (was already captured, encoded and made available) or is not valid anymore (was removed from the server). There is no need to update the MPD only because the MPD describes a live service. A live service with a known start time and a known end-time can be described by a single, non-updating MPD. Updating of the MPDs is possible e.g. to allow the addition of a new period element into the MPD. The MPD update duration may be much larger than the media segment duration. In one non-limiting example, the client should update the MPD every 5 min, while new media segments become available every 5 sec.

eMBMS use the DASH for broadcast streaming. MBMS Download allows delivering a sequence of files for the delivery. The sequence of files may be DASH segment files of a DASH session. The MPDs and MPD updates may also be provided in-band with the media segments using an MBMS download session. The initial MPD may also be fetched using unicast after which all subsequent MPDs can be received on MBMS.

Figure 1:
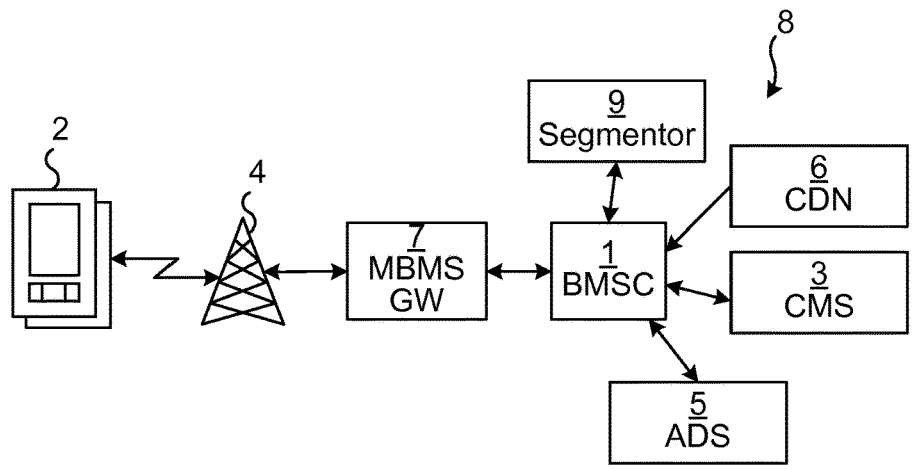
FIG. 1 is a schematic diagram illustrating a communication system where embodiments presented herein may be applied.

FIG. 1 is a schematic diagram illustrating a communication system 8 where embodiments presented herein may be applied. The communication system 8 comprises one or more radio base stations 4, here in the form of an evolved Node B, also known as eNode B or eNB. The radio base stations 4 could also be in the form of a Node B, BTS (Base Transceiver Station) and/or BSS (Base Station Subsystem), etc. The radio base stations 4 provide radio connectivity to a plurality of mobile or fixed streaming clients 2 being wireless devices. The streaming clients 2 shown here are capable of receiving a broadcast and/or a multicast content feed. The term wireless device is also known as mobile communication terminal, user equipment, mobile terminal, user terminal, user agent, machine-to-machine device etc., and can be, for example, what today are commonly known as a mobile phone or a tablet/laptop with wireless connectivity or fixed mounted terminal.

The communication system 8 may e.g. comply with any one or a combination of LTE-SAE (Long Term Evolution-System Architecture Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, such as LTE-Advanced, as long as the principles described hereinafter are applicable.

The communication system 8 further comprises components to support broadcast content, in a broadcast or a multicast way, i.e. multiple streaming clients 2 can receive the same content in a point-to-multipoint fashion. This increases network efficiency, e.g. compared to point-to-point streaming, also known as unicast.

The components for broadcast can comply with any suitable standard, e.g. 3GPP MBMS ($3^{rd}$ Generation Partnership Project Multimedia Broadcast Multicast Service), 3GPP MBMS Evolution, 3GPP IMB (Integrated Mobile Broadcast), 3GPP eMBMS (Evolved MBMS), DVB-H (Digital Video Broadcasting-Handheld), DVB-NGH (Digital Video Broadcasting-Next Generation Handheld), or any other current or future broadcast system over wireless networks, as long as the principles described hereinafter are applicable. In this document, embodiments are presented as applied in 3GPP MBMS release 6 or later, but it is to be understood that this does not imply that any other standard is excluded.

A multimedia streaming service node 1, such as a Broadcast Multicast Service Center (BMSC) is also provided. Hereinafter, the term BMSC will be used, but it is to be understood that the embodiments presented can equally well be employed with other embodiments of multimedia streaming service nodes. The multimedia streaming service node 1 is responsible for the general flow of content from content providers to the streaming clients 2, including providing both main streaming content and secondary streaming content at appropriate points in time. Secondary streaming content can e.g. be advertisements, special announcements, emergency messages, etc. Main streaming content is the main content of the content channel in which the secondary streaming content can be included.

One or more content providers, providing content through a content delivery network (CDN) 6 are also connected to the BMSC 1. In this way, the streaming clients 2 can receive broadcast content from the content delivery network 6. The content which is provided from the content delivery network 6 can e.g. comprise video content and/or audio content.

A content management system (CMS) 3 is also connected to the BMSC 1. A secondary streaming content decision service 5 communicates with the BMSC 1 regarding how secondary streaming content is to be combined with main streaming content. In FIG. 1, the secondary streaming content decision service 5 is represented by an Advertisement Decision Service (ADS). Hereinafter, the term ADS will be used for the secondary streaming content decision service 5, but it is to be understood that the embodiments presented are by no means limited to such an embodiment of a secondary streaming content decision service, but can be employed using any suitable secondary streaming content decision service.

An MBMS-GW 7 connects the BMSC 1 with the radio access network and radio base stations 4. Moreover, the MBMS-GW 7 is responsible for session management, etc.

A segmentor 9, also known as a live encoder/segmentor, is responsible for encoding live content from the content delivery network in an appropriate format and segmenting the encoded content in smaller segment files. The segment files can e.g. include video and/or audio data. These segment files are then later provided via the MBMS-GW 7 to the streaming clients 2. The streaming clients 2 have a buffer to store and decode the segment files to provide continuous content presentation to the user of the streaming clients 2.

A party that owns and operates the radio base stations 4, the MBMS-GW 7, the BMSC 1, and the segmentor 9 is herein called an operator. Content can be provided externally from or internally within the operator. The operator can thus optionally be responsible for more components of the communication system 8.

In order not to obscure the concepts presented herein, other (sometimes optional) network nodes such as Radio Network Controller, GGSN (Gateway GPRS (general packet radio service) support node), SGSN (serving GPRS support node), are omitted from the communication system 8 of FIG. 1, but may be used as needed during operation. Other components not required to present the embodiments presented herein are omitted for reasons of clarity.

In an eMBMS broadcast delivery solution, different broadcast sessions can be set up for different programs. For each program, secondary streaming content such as advertisements can be sold and included in the stream to the streaming clients. The advertisers will then create the secondary streaming content and deliver this to the operator for inclusion in interruptions of delivery of primary streaming content. Analogously, a provider of special announcements or emergency messages creates the secondary streaming content and is responsible for making this available to the operator for inclusion in interruptions of delivery of primary streaming content. Especially in the case of emergency messages, such delivery may take place with short notice. The operator is then responsible for providing the secondary streaming content at appropriate points in time.

The interworking of the different components of FIG. 1 are explained in more detail with reference to the sequence diagram of FIG. 6 below.

Figure 2:
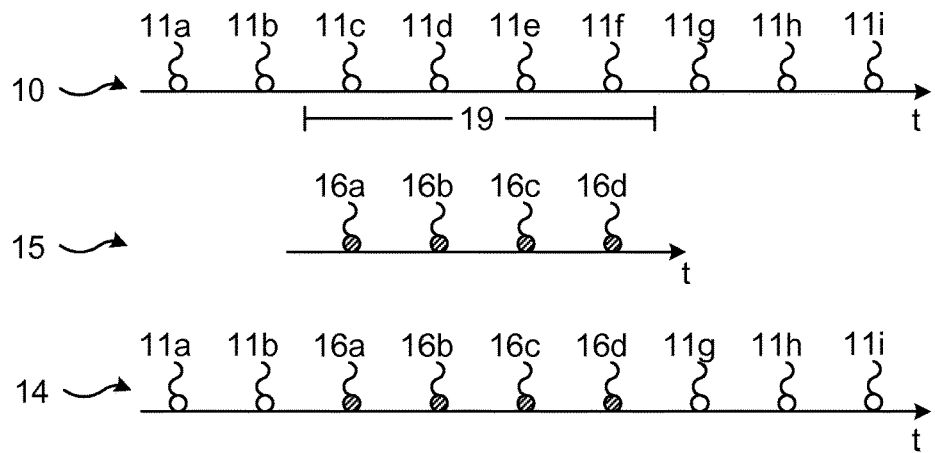
FIG. 2 is a schematic diagram illustrating how segment files from main content and secondary content can be combined.

FIG. 2 is a schematic diagram illustrating how segment files from main content and secondary content can be combined. From top to bottom, it is shown main streaming content 10, secondary streaming content and combined streaming content 14. Time flows from left to right for all content.

The main streaming content 10 has been segmented into a number of main segment files 11a-i. In one embodiment, the main streaming content 10 is live content, where the content gradually becomes available from the content source, even if it may be with some delay. Each main segment file 11a-i can be relatively small relative the entire main content. For example, each main segment file 11a-i could cover a number of seconds. However, the size of each main segment file can be set to any suitable length of time. In a normal stream to streaming clients, the segment files 11a-i are provided one by one via the MBMS GW to the streaming clients. However, a time slot 19 for secondary content has been determined, e.g. to include advertisements or other announcements. Some main segment files 11c-f correspond in time to the time slot 19 for secondary content. These main segment files 11c-f are discardable and may be replaced by secondary segment files.

The secondary streaming content 15 in itself has also been segmented into one or more secondary segment files 16a-d. The secondary segment files 16a-d here correspond in time to the time slot 19 for secondary content. The secondary segment files 16a-d can be associated with one set of secondary content (e.g. one advertisement) or several sets of secondary content (e.g. several advertisements).

The combined streaming content 14 is a combination of the main streaming content 10 which are not in the time slot 19 for secondary content to which the secondary streaming content 15 is added. The combined streaming content 15 comprises the main segment files 11a-b prior to the time slot 19 for secondary streaming content, the secondary segment files 16a-d corresponding to the time slot 19 for the secondary content and the main segment files 11g-i after the time slot 19 for secondary content.

The secondary segment files 16a-d corresponding to the time slot 19 for secondary content are modified to fit in between the main segment files 11a-b, 11g-i prior to and after the time slot 19 for secondary content. This includes modifying sequence numbers and time references of the secondary segment files 16a-d corresponding to the time slot 19 for secondary content.

Looking at an example of sequence numbers, if the main segment files 11a-i have respective sequence numbers of s1, s2, s3, s4, s5, s6, s7, s8 and s9, and the secondary segment files 16a-d initially have sequence numbers as1, as2, as3 and as4, then the modified sequence numbers of the secondary segment files 16a-d are s3, s4, s5 and s6, in order to fit in with the main segment files surrounding the time slot 19.

Looking at an example of time references, if the main segment files 11a-i have respective time references of 1000, 2000, 3000, 4000, 5000, 6000, 7000, 8000 and 9000 in a unit of hundredths of seconds, and the secondary segment files 16a-d initially have time references 0000, 1010, 2020 and 3020, then the modified time references of the secondary segment files can for example be 3000, 4010, 5020, 6020. The duration of the first two of the secondary segment files 16a, 16b are not equal to the corresponding discardable main segment files and are 10 hundredths of a second longer. Any subsequent main segment files to be distributed after the added secondary segment files are then adjusted to reflect this discrepancy. This may thus also affect secondary segment files in future time slots for secondary content as these are adjusted in accordance with the main segment files. Hence the time references of the last three main segment files 11g-i of the combined streaming content 14 are also adjusted and now have respective time references of 7020, 8020 and 9020.

In this way, any streaming client receiving the content will treat the combined streaming content 14 a single continuous content stream. This prevents any redirection to another stream for secondary content and subsequent rebuffering, which can lead to black screens or other poor user experiences. Also, since the inclusion of the secondary content is transparent for the wireless device, any media description document, such as the MPD for DASH, does not need to be updated to include the secondary content. This prevents rebuffering on the client device side and also reduces any specific media description document signalling. It is to be noted that this method is not limited to broadcast/multicast, but could also be used for unicast solutions.

Figure 3A:
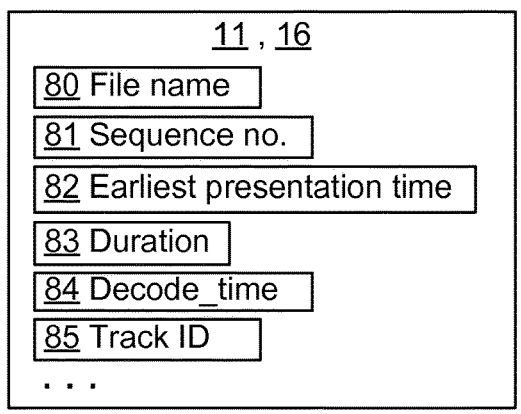
FIGS. 3A-B are schematic diagram illustrating data elements of the main and secondary segment files.

FIG. 3A is a schematic diagram illustrating data elements of the main and secondary segment files. These data elements will be described with reference to a single segment file 11, 16 and all aspects of the segment file 11, 16 are applicable to each one of the main segment files 11a-i and secondary segment files 16a-d of FIG. 2. Some or all data elements can be part of an ISO DASH file and thus form part of the segment file in question.

Since the segment file 11, 16 is a file, it has a file name 80. Optionally, the file name also comprises a sequence number. The sequence number 81 can also be provided as a separate data element. Another data element is an earliest presentation time 82. The earliest presentation time 82 defines the earliest time that the segment file 11, 16 can be presented to a user on the streaming client. A duration 83 is a data element defining the duration of the segment file 11, 16. A decode time 84 defines an absolute decode time, measured on a media timeline, as to when the media content of the segment file is to be played. A track ID 85 defines the track, or stream to the client. There may be many more data elements than those presented here, but these are left out in this description in order not to obscure embodiments presented herein. The data elements may be part of a data structure according to ISO media file format, see e.g. ISO/IEC 14496-12, 2012.

When secondary segment files are to be included surrounded by main segment files, several of the data elements may be modified. For example, the sequence number 81 of the secondary segment file 16a-d in question is modified to follow the preceding segment file in the combined content. When the file name 80 comprises the sequence number, then this is also modified. Moreover, the earliest presentation time 82 and the decode time 84 are modified, as described above with reference to FIG. 2, to follow in time after the preceding segment file in the combined content. In one embodiment, the earliest presentation time 82 is calculated as the sum of the earliest presentation time 82 of the preceding segment file and the duration 83 of the preceding segment file. The reason for such a calculation is that there can be some discrepancy of the duration of the secondary segment file 16a-d discardable main segment, as explained with reference to FIG. 2 above. In one embodiment, the earliest presentation time 82 is set to be the earliest presentation time of the corresponding discardable main segment file, i.e. with the same sequence number (after modifying the sequence number of the secondary segment file). The track ID 85 of the secondary segment file 16a-d in question is set to be the track ID of the preceding main segment files, such that the streaming client does not disrupt the presentation of the combined content when starting to present media from the secondary segment files 16a-d.

Figure 3B:
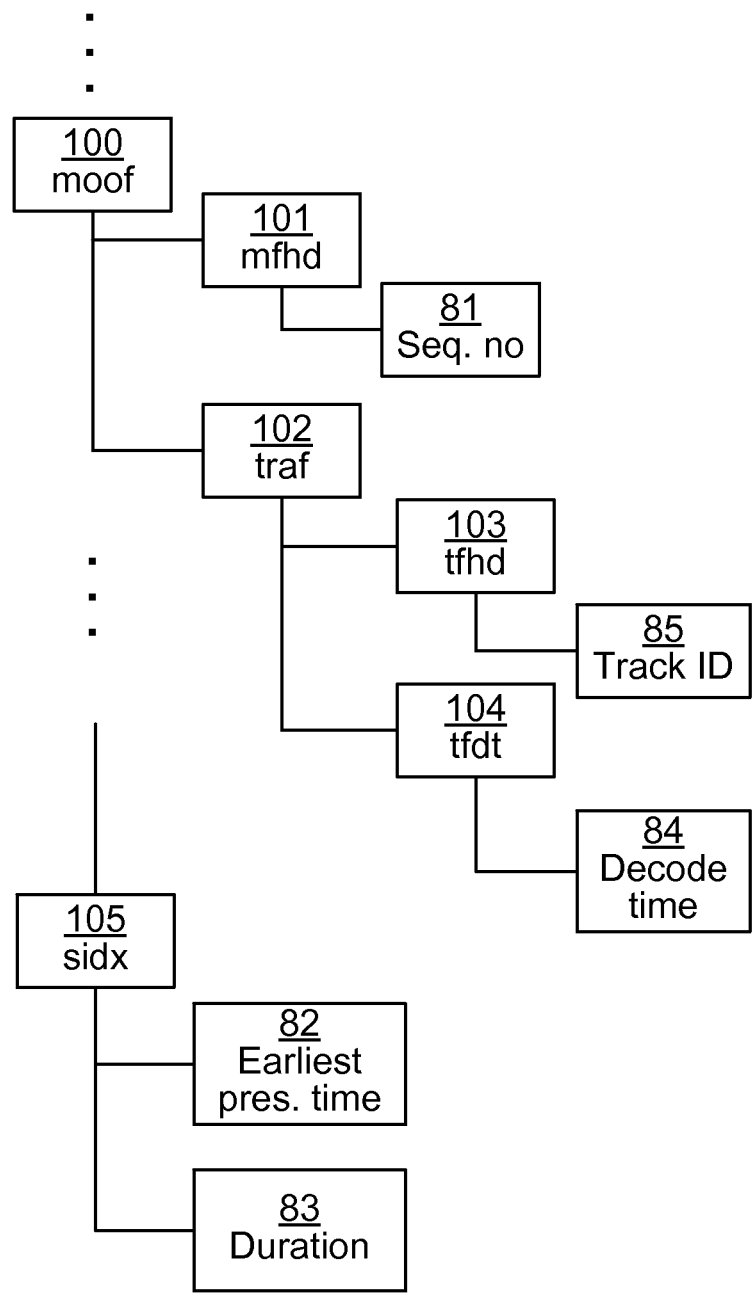

When data elements of FIG. 3A are included in file complying with the ISO media file format, this could be implemented as shown in FIG. 3B. The ISO media file format comprises data elements in an XML (Extensible Markup Language) hierarchy. Only elements which are relevant to embodiments presented herein are shown in FIG. 3B. There may be many more elements of the XML hierarchy which are not shown.

At the top level, it is shown a moof element 100 and an sidx element 105.

The moof element 101 is a container representing a movie fragment, pertaining to the segment file in question. The moof element 100 contains an mfhd element 101 and a traf element 102. The mfhd element 101 is a movie fragment header which i.a. contains the sequence number 81.

The traf element 102 represents one media track, where a media track is a track for only one media, e.g. video or audio but not both. Hence, if one segment file comprises one video track and two audio tracks, there will be three traf elements 102.

The traf element 102 comprises a tfhd element 103 which is a track header. The tfhd element 103 contains the track ID 85. The traf element 102 also comprises a tfdt element 104. The tfdt element 104 is a track fragment base media decode time element which comprises the decode time 84 which is the absolute decode time, measured on the media timeline, of the first sample of the track fragment.

The sidx element 105 is a segment index element which can represent a number of subsegments. The sidx element comprises the earliest presentation time 82 and the duration, which for the whole segment file is calculated as the sum of the duration of all subsegments.

Figure 4A:
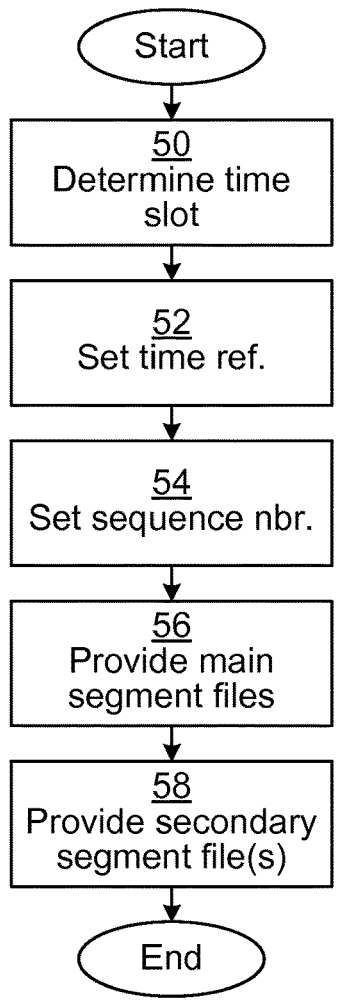
FIGS. 4A-B are flow charts illustrating methods for combining main streaming content and secondary streaming content.
Figure 4B:
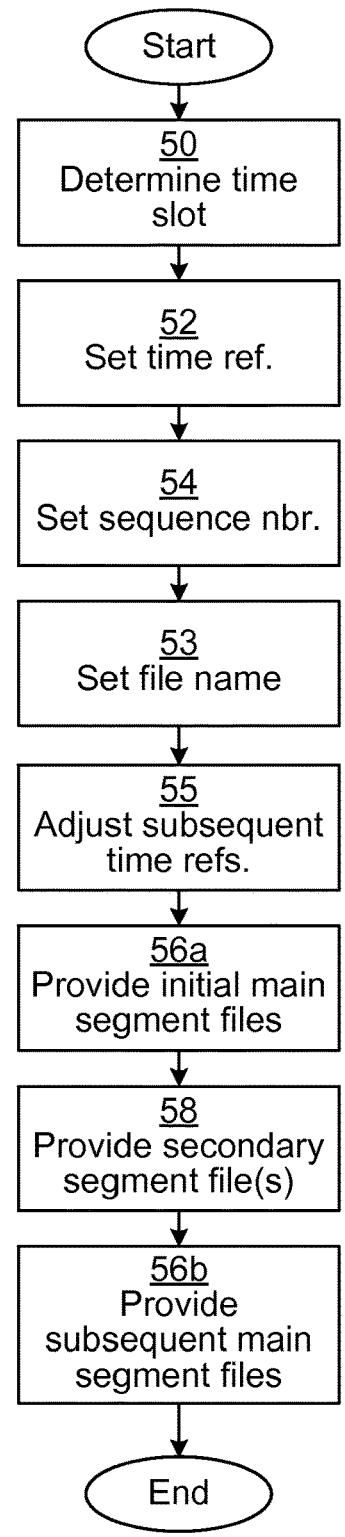

FIGS. 4A-B are flow charts illustrating methods for combining main streaming content and secondary streaming content. As explained above with reference to FIGS. 3A and 3B, the main streaming content comprises a plurality of main segment files and the secondary streaming content comprises at least one secondary segment file. In one embodiment, the main streaming content is live content. The methods are performed in a BMSC for one time slot for secondary content (i.e. one break in the main content) and one or more sets of secondary content (i.e. one or more advertisements/announcements). The method may be repeated for further time slots for secondary content within the same main content or for different main content. The method may be performed for audio content and/or video content. First, the method illustrated in FIG. 4A will be described.

In a determine time slot step 50, a time slot (see 19 of FIG. 2) within the main streaming content is determined, where secondary streaming content should be provided. The time slot corresponds to at least one discardable main segment file. As explained above, the time slot is a period of time where the secondary content should be provided to streaming clients instead of main content. Details about the time slot can e.g. be received from the CMS (see 3 of FIG. 1). Subsequent to step 50 parameters are determined and segment files are provided. More specifically, time reference(s) are set, sequence number(s) are set and main and secondary segment files are provided.

In a set time reference step 52, the time reference (see 82 of FIGS. 3A and 3B) of each one of the at least one secondary segment file is set to correspond to a time reference of the at least one discardable main segment file. The time reference does not need to be an exact match with a corresponding discardable main segment file, as long as the time reference is after the preceding segment file (main segment file or secondary segment file) and before the subsequent segment file (main segment file or secondary segment file). The time reference may be the earliest presentation time parameter (see 82 of FIGS. 3A and 3B) and/or the decode time parameter (see 84 of FIGS. 3A and 3B). The time reference can be set in accordance with preceding time reference and preceding duration as explained above.

In a set sequence number step 54, a sequence number (see 81 of FIGS. 3A and 3B) of each one of the at least one secondary segment file is set to correspond to a sequence number of the at least one discardable main segment file. This helps, along with the adjusted time reference of the preceding step, the streaming clients to treat the combined streaming content as one content stream.

In a provide main segment files step 56, the main segment files which are distinct from the at least one discardable main segment file are provided for delivery to at least one streaming client.

In a provide secondary segment files(s) step 58, the at least one secondary segment file is provided for delivery to the at least one streaming client.

However, it is to be understood that the order in which the segment files are made available is not crucial as long as the segment files are made available such that they can be delivered to the streaming client. For example, main segment files after the time slot may in fact be made available prior to making the secondary segment files available. Nevertheless, the streaming client presents combined content in the correct order due to the updated sequence numbers and time references.

The steps of providing the at least one secondary segment and providing the main segment files optionally involves the use of MBMS or eMBMS.

Now the method illustrated by the flow chart of FIG. 4B will be described. This method includes steps to modify the file name, adjusting subsequent time references and stricter control of the order of provision of segment files. All steps of the flow chart of FIG. 4A are also part of the flow chart of FIG. 4B and will not be described again, unless there are any differences to what is described above.

After the set sequence number step 54, there is here a set file name step 53. In this step, a filename of each one of the at least one secondary segment file is set where the filename includes the sequence number which is set in the respective secondary segment file.

After the set sequence number step 54, there is here an adjust subsequent time references step 55. In this step, the time reference (82 of FIGS. 3A and 3B) of each one of all main segment files after the time slot are adjusted, to reflect any differences in duration between the at least one discardable main segment file and the at least one secondary segment file, as explained with reference to FIG. 2 above. In other words, if the announcement or advertisement is of slightly different duration than the segment files it replaces, then the time references of all subsequent main segment files are adjusted. In this way, the switch from the secondary streaming content back to the main streaming content can be made with time references reflecting the actual duration.

In this method, the step of providing main segment files 56 of FIG. 4A has been broken up in two steps: a provide initial main segment files step 56a and a provide subsequent main segment files 56b.

In the provide initial main segment files step 56a, the main segment files (e.g. 11a-b of FIG. 2) which are prior to the time slot are provided prior to the provide secondary segment file(s) step 58.

In the provide subsequent main segment files step 56b, the main segment files (e.g. 11g-i of FIG. 2) which are after the time slot are provided after the provide secondary segment file(s) step 58.

Figure 5:
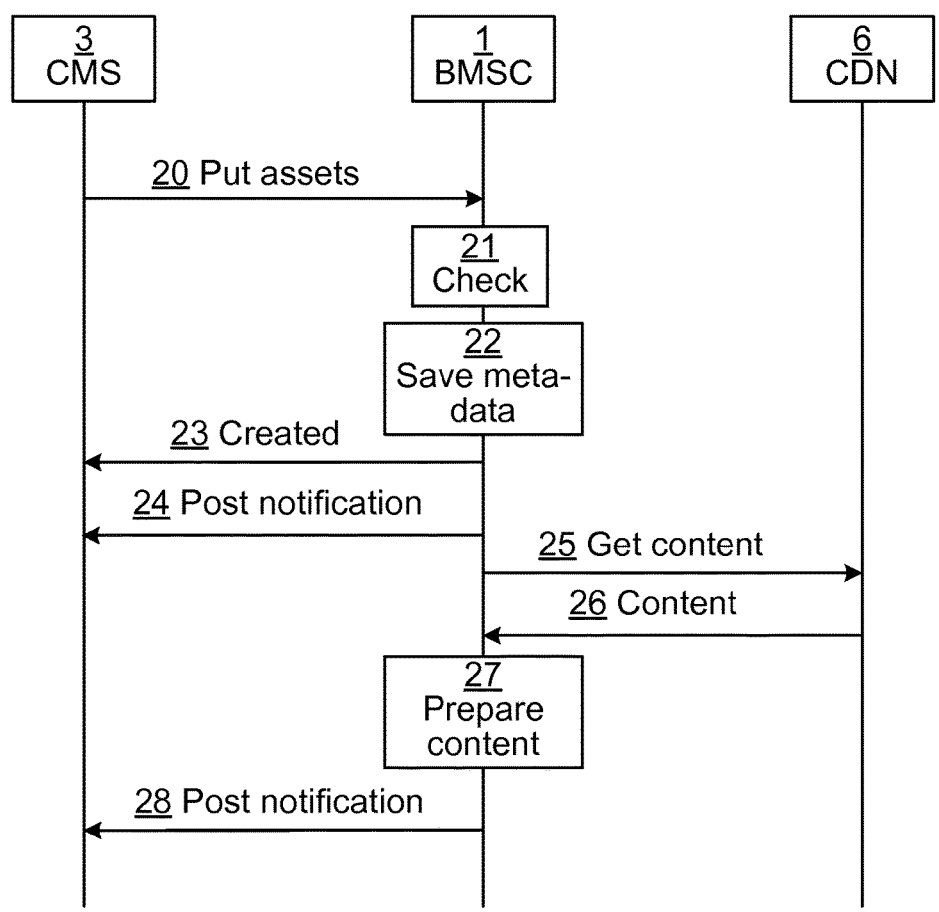
FIG. 5 is a sequence diagram illustrating the provision of content according to an embodiment which can be applied in the environment shown in FIG. 1.

FIG. 5 is a sequence diagram illustrating the provision of content according to an embodiment which can be applied in the environment shown in FIG. 1.

First, the CMS 3 sends a message 20 to create an asset to the BMSC 1. This message 20 comprises metadata of the asset and the message 20 can e.g. be an HTTP PUT message. The metadata is later used in the generation of the MPD and for some fields forming part of the segment files being e.g. a ISO DASH file.

The BMSC 1 then checks 21 the request and the consistency of the metadata. If this fails, the BMSC can respond (not shown) with details of the failure to the CMS 3, e.g. using an HTTP 409 Conflict response or an HTTP 400 Bad Request response.

Once the metadata and request have passed the check, the BMSC 1 saves the metadata 22 in a database connected to, or forming part of, the BMSC 1. The BMSC 1 then responds that the request has been successfully processed, e.g. with an HTTP 201 Created response.

The BMSC 1 then decides to download the content and sends e.g. an HTTP POST message to the CMS 3 with a notification that the current state of the BMSC for this content is that the content is being processed. After this, the BMSC 1 requests 25 the content, e.g. using an HTTP GET request to the CDN 6. The CDN 6 then responds with the content 26 to the BMSC 1.

Once received by the BMSC 1, the BMSC optionally prepares the content, e.g. by decompressing it. At this stage, the BMSC notifies 28 the CMS that the content has been verified, e.g. using an HTTP POST message.

It is to be noted that if the message 20 to create an asset concerns live content, the BMSC 1 will not be able to get the content right away. Hence, in such a situation, this sequence ends with the message 23 from the BMSC 1 to the CMS of successful creation of the asset.

Figure 6:
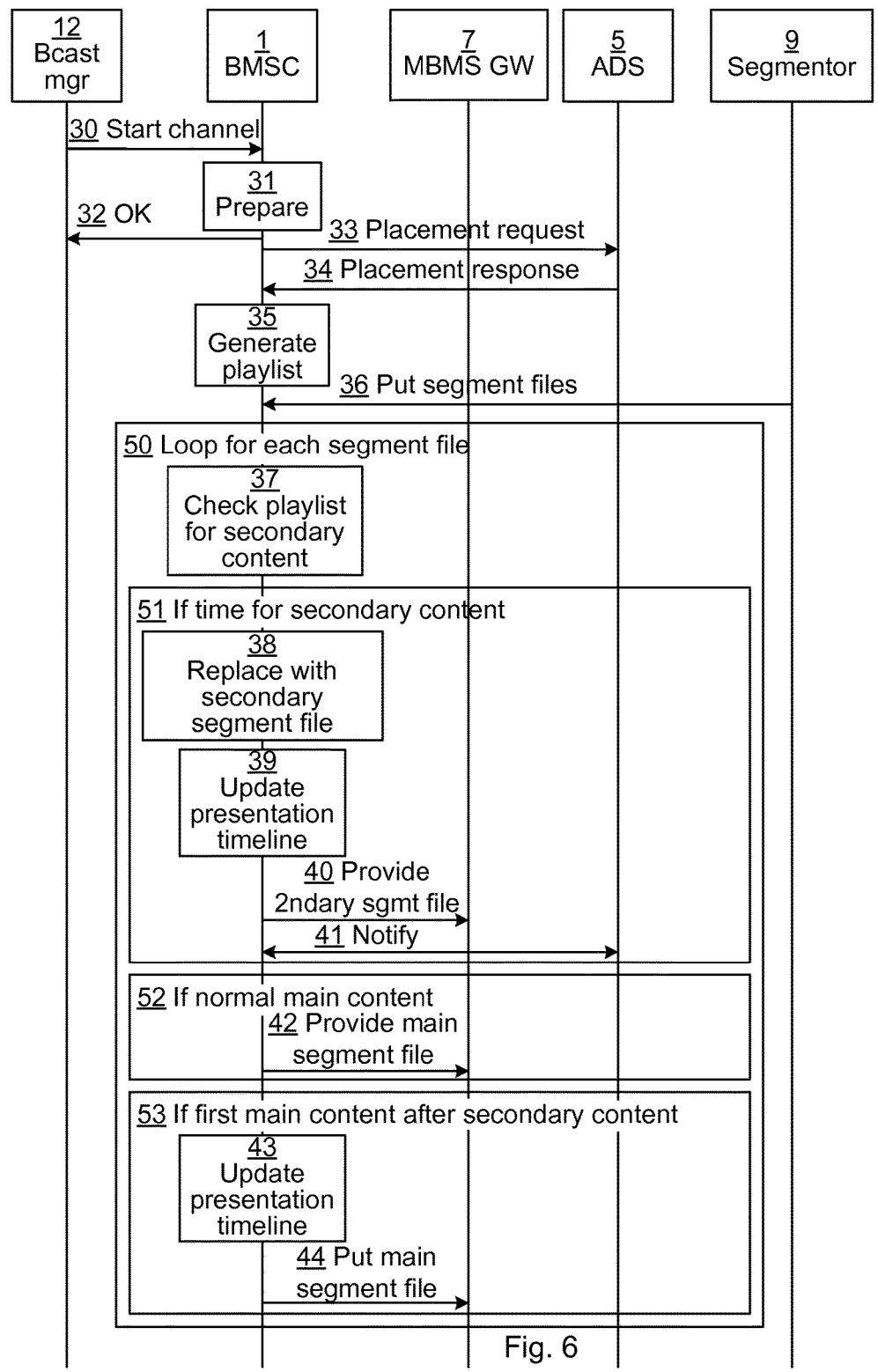
FIG. 6 is a sequence diagram illustrating how main streaming content and secondary streaming content can be combined.

FIG. 6 is a sequence diagram illustrating how main streaming content and secondary streaming content can be combined. This corresponds to the methods illustrated in FIGS. 4A-B but includes more components than the BMSC 1 and does not explicitly include all details of the methods illustrated in FIGS. 4A-B. It is to be noted, however, that all details explained with reference to FIGS. 4A-B above may be applied in the sequence shown in FIG. 6. A broadcast manager 12 is the function which manages the broadcast. The broadcast manager 12 could be implemented as a separate node or it could be part of the BMSC 1 or the CMS 4.

The broadcast manager 12 starts by sending a start channel message 30 to the BMSC 1, e.g. as an HTTP request. The start channel message 30 can e.g. comprise a channel identifier and a reference to a storage location where segment files are to be made available (such as a WebDAV (Web Distributed Authoring and Versioning) folder).

The BMSC 1 prepares 31 for later being able to receive and deliver the actual content by storing the data of the start channel message 30 and preparing the storage location, e.g. by creating a WebDAV folder. After this, the BMSC 1 responds with an OK message 32 to the broadcast manager 12, e.g. using an HTTP 200 OK response.

The BMSC 1 then sends a placement request 33 to the ADS 5, e.g. as an HTTP request. The placement request includes identification of the main asset, timeslot, etc. to allow the ADS to determine what secondary content to insert into the timeslot. ADS server could retrieve the ad info (ad asset id) according to the request info and the rules defined in the ADS. The ADS responds with a placement response 34, e.g. as an HTTP response, including identifiers of the secondary content (e.g. an asset identifier of the secondary content). For example, the placement request and response can comply with SCTE (Society of Cable Telecommunication Engineers) 130-3 of 2010.

The BMSC 1 is now ready to generate a playlist 35 according to the placement response to combine the main content and secondary content and schedules a next placement request. The next placement request is scheduled to cover future time slots for secondary content (e.g. future advertisement breaks).

Once the live content starts to become available, the segmentor 9 receives the live content (not shown) and splits up the live content in segment files. Each segment file is then stored 36 in the storage location, e.g. in the WebDAV folder. Each segment files comprises a number of parameters as explained above with reference to FIGS. 2 and 3, i.e. comprising time reference and sequence number.

The BMSC 1 loops 50 through for each segment file. Initially in this loop, the BMSC 1 checks the playlist to determine whether there currently is a time slot for secondary content.

When there is currently time slot for secondary content 51, the BMSC 1 starts by replacing 38 discardable main segment file(s) with secondary segment file(s) as explained above. Hence, the presentation timeline, as defined by time references in the secondary segment file(s), needs to be updated 39. The BMSC 1 is then ready to provide 40 the secondary segment file(s) by storing such files in the storage location, e.g. the WebDAV folder, for delivery through the MBMS gateway to streaming clients. Once this is done, the BMSC 1 notifies 41 the ADS 5 of the placement of secondary content.

When, on the other hand, there is not currently a time slot for the secondary content and normal main content is to be provided 52, the BMSC 1 provides 42 the main segment files by storing such files in the storage location, e.g. the WebDAV folder, for delivery through the MBMS gateway to streaming clients.

A special case is when there is not currently a time slot for secondary content and main content is to be provided, but it is the first such main content after a time slot for secondary content 53. In such a case, the presentation timeline is optionally updated 43, e.g. by modifying the time references of any subsequent segment files to reflect any discrepancies between the duration of the discardable main segment files and secondary segment files, as explained above.

Figure 7:
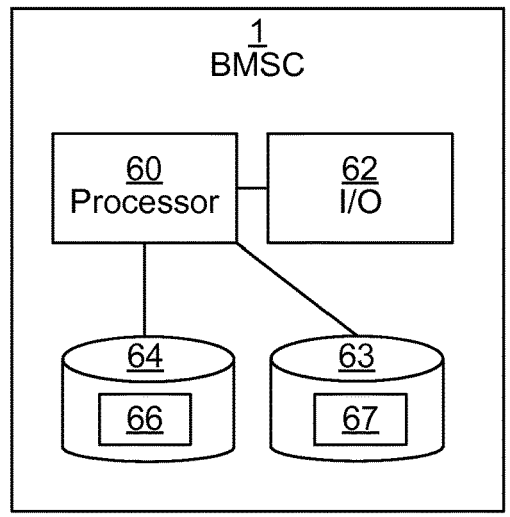
FIG. 7 is a schematic diagram showing some components of the BMSC of FIG. 1.

FIG. 7 is a schematic diagram showing some components of the BMSC 1 of FIG. 1. A processor 60 is provided using any combination of one or more of a suitable central processing unit (CPU), multiprocessor, microcontroller, digital signal processor (DSP), application specific integrated circuit etc., capable of executing software instructions 66 stored in a memory 64. The Memory can thus be considered to be a computer program product. The processor 60 can be configured to execute the method described with reference to FIGS. 4A-B above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 63 is also provided for reading and/or storing data during execution of software instructions in the processor 60. The data memory 63 can be any combination of read and write memory (RAM) and read only memory (ROM) and may also comprise persistent storage, which, for example, can be any single one or combination of magnetic memory, optical memory, solid state memory or even remotely mounted memory. The data memory 63 can e.g. hold segment files 67 such as main segment files and secondary segment files.

The BMSC 1 further comprises an I/O interface 62 for communicating with other external entities, e.g. using a wired galvanic and/or optical network connection for communication with the CMS 3, ADS 5, segmentor 9, MBMS Gateway 7, etc. Optionally, the I/O interface 62 also includes a user interface (not shown).

Other components of the BMSC 1 are omitted in order not to obscure the concepts presented herein.

Figure 8:
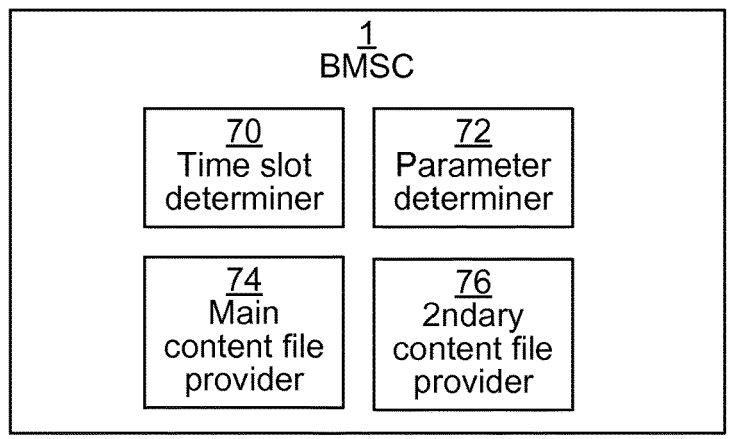
FIG. 8 is a schematic diagram showing functional modules of the BMSC of FIGS. 1 and 7.

FIG. 8 is a schematic diagram showing functional modules of the BMSC 1 of FIGS. 1 and 7. The modules can be implemented using software instructions such as a computer program executing in the BMSC 1 and/or using hardware, such as application specific integrated circuits, field programmable gate arrays, discrete logical components, transceivers, etc. The modules correspond to the steps in the methods illustrated in FIGS. 4A-B.

A time slot determiner 70 comprises means for determining a time slot within main streaming content where secondary streaming content should be provided. The time slot corresponds to at least one discardable main segment file. This module 70 corresponds to the determine time slot step 50 of FIGS. 4A-B.

A parameter determiner 72 comprises means for setting a time reference of each one of the at least one secondary segment file to correspond to a time reference of the at least one discardable main segment file. Also, the parameter determiner 72 comprises means for setting a sequence number of each one of the at least one secondary segment file to correspond to a sequence number of the at least one discardable main segment file. This module 72 corresponds to the set time reference step 52 and the set sequence number step 54 of FIGS. 4A-B and the set file name step 53 and the adjust subsequent time references step 55 of FIG. 4B.

A main content file provider 74 comprises means for providing the main segment files which are distinct from the at least one discardable main segment file, for delivery to at least one streaming client. This module 74 corresponds to the provide main segment files step 56 of FIG. 4A and the provide initial main segment files step 56a and the provide subsequent main segment files step 56b of FIG. 4B.

A secondary content file provider 76 comprises means for providing the the at least one secondary segment file for delivery to the at least one streaming client. This module 76 corresponds to the provide secondary segment file(s) step 58 of FIGS. 4A-B.

Figure 9:
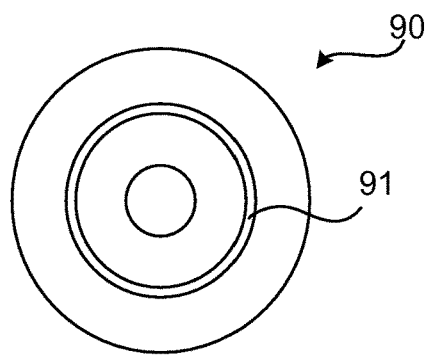
FIG. 9 shows one example of a computer program product comprising computer readable means.

FIG. 9 shows one example of a computer program product 90 comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 66 of FIG. 7 or as a removable solid state memory, e.g. a flash storage memory. While the computer program 91 is here schematically shown as a track on the depicted optical disk, the computer program can be stored in any way which is suitable for the computer program product.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for combining main streaming content comprising a plurality of main segment files and secondary streaming content comprising at least one secondary segment file, the method being performed in a multimedia streaming service node and comprising the steps of:
   determining a time slot within the main streaming content where secondary streaming content should be provided, the time slot corresponding to at least one discardable main segment file to be replaced by the at least one secondary segment;
   setting a time reference of each one of the at least one secondary segment file to correspond to a time reference of the at least one discardable main segment file;
   setting a sequence number of each one of the at least one secondary segment file to correspond to a sequence number of the at least one discardable main segment file;
   providing the main segment files which are distinct from the at least one discardable main segment file, for delivery to at least one streaming client;
   providing the at least one secondary segment file for delivery to the at least one streaming client; and
   adjusting a time reference of each one of all main segment files after the time slot, to reflect any differences in duration between the at least one discardable main segment file and the at least one secondary segment file.

2. The method according to claim 1, wherein the main streaming content is live content.

3. The method according to claim 1, wherein the multimedia streaming service node is a broadcast/multicast service centre and the steps of providing the at least one secondary segment file and providing the main segment files comprise the use of a multimedia broadcast/multicast service, MBMS, or evolved MBMS.

4. The method according to claim 1, wherein the step of determining a time slot comprises receiving details about the time slot from a content management system.

5. The method according to claim 1, further comprising the step of:
   setting a filename of each one of the at least one secondary segment file where the filename includes the sequence number which is set in the respective secondary segment file.

6. The method according to claim 1, wherein the method is performed for audio content as well as for video content.

7. The method according to claim 1, wherein in the step of setting a time reference, the time reference includes at least one of an earliest presentation time parameter and a decode time parameter of the respective secondary segment file.

8. The method according to claim 1, wherein the step of providing the main segment files comprises the two substeps of:
   providing the main segment files which are prior to the time slot prior to the step of providing the at least one secondary segment file; and
   providing the main segment files which are after the time slot after the step of providing the at least one secondary segment file.

9. A multimedia streaming service node for combining main streaming content comprising a plurality of main segment files and secondary streaming content comprising at least one secondary segment file, the multimedia streaming service node comprising:
   a processor; and
   a memory storing instructions that, when executed by the processor, causes the multimedia streaming service node to:
      determine a time slot within the main streaming content where secondary streaming content should be provided, the time slot corresponding to at least one discardable main segment file to be replaced by the at least one secondary segment;
      set a time reference of each one of the at least one secondary segment file to correspond to a time reference of the at least one discardable main segment file;
      set a sequence number of each one of the at least one secondary segment file to correspond to a sequence number of the at least one discardable main segment file;
      provide the main segment files which are distinct from the at least one discardable main segment file, for delivery to at least one streaming client;
      provide the at least one secondary segment file for delivery to the at least one streaming client; and
      adjust a time reference of each one of all main segment files after the time slot, to reflect any differences in duration between the at least one discardable main segment file and the at least one secondary segment file.

10. The multimedia streaming service node according to claim 9, wherein the main streaming content is live content.

11. The multimedia streaming service node according to claim 9, wherein the multimedia streaming service node is a broadcast/multicast service centre and the instructions to provide the at least one secondary segment file and provide the main segment files comprise instructions that, when executed by the processor, causes the multimedia streaming service node to use of a multimedia broadcast/multicast service, MBMS, or evolved MBMS.

12. The multimedia streaming service node according to claim 9, wherein the instructions to determine a time slot comprises instructions that, when executed by the processor, causes the multimedia streaming service node to receive details about the time slot from a content management system.

13. The multimedia streaming service mode according to claim 9, further comprising instructions that, when executed by the processor, causes the multimedia streaming service node to:
   set a filename of each one of the at least one secondary segment file where the filename includes the sequence number which is set in the respective secondary segment file.

14. The multimedia streaming service node according to claim 9, wherein the instructions comprise instructions that, when executed by the processor, causes the multimedia streaming service node to handle audio content and video content.

15. The multimedia streaming service node according to claim 9, wherein the instructions to set a time reference comprise instructions that, when executed by the processor, causes the multimedia streaming service node to set the time reference including at least one of an earliest presentation time parameter and a decode time parameter of the respective secondary segment file.

16. The multimedia streaming service node according to claim 9, wherein the instructions to provide the main segment files comprise instructions that, when executed by the processor, causes the multimedia streaming service node to:
   provide the main segment files which are prior to the time slot prior to providing the at least one secondary segment file; and
   provide the main segment files which are after the time slot after providing the at least one secondary segment file.

17. A computer program product, comprising a computer program for combining main streaming content, comprising a plurality of main segment files and secondary streaming content, comprising at least one secondary segment file, the computer program product further comprising a non-transitory computer readable medium on which the computer program is stored and the computer program comprising computer program code which, when run on a multimedia streaming service node, causes the multimedia streaming service node to:
   determine a time slot within the main streaming content where secondary streaming content should be provided, the time slot corresponding to at least one discardable main segment file to be replaced by the at least one secondary segment;
   set a time reference of each one of the at least one secondary segment file to correspond to a time reference of the at least one discardable main segment file;
   set a sequence number of each one of the at least one secondary segment file to correspond to a sequence number of the at least one discardable main segment file;
   provide the main segment files which are distinct from the at least one discardable main segment file, for delivery to at least one streaming client;
   provide the at least one secondary segment file for delivery to the at least one streaming client; and
   adjust a time reference of each one of all main segment files after the time slot, to reflect any differences in duration between the at least one discardable main segment file and the at least one secondary segment file.

* * * * *